April 22, 1930. J. A. PENDERGRASS 1,755,932
AIRCRAFT PONTOON
Filed June 5, 1929 3 Sheets-Sheet 1
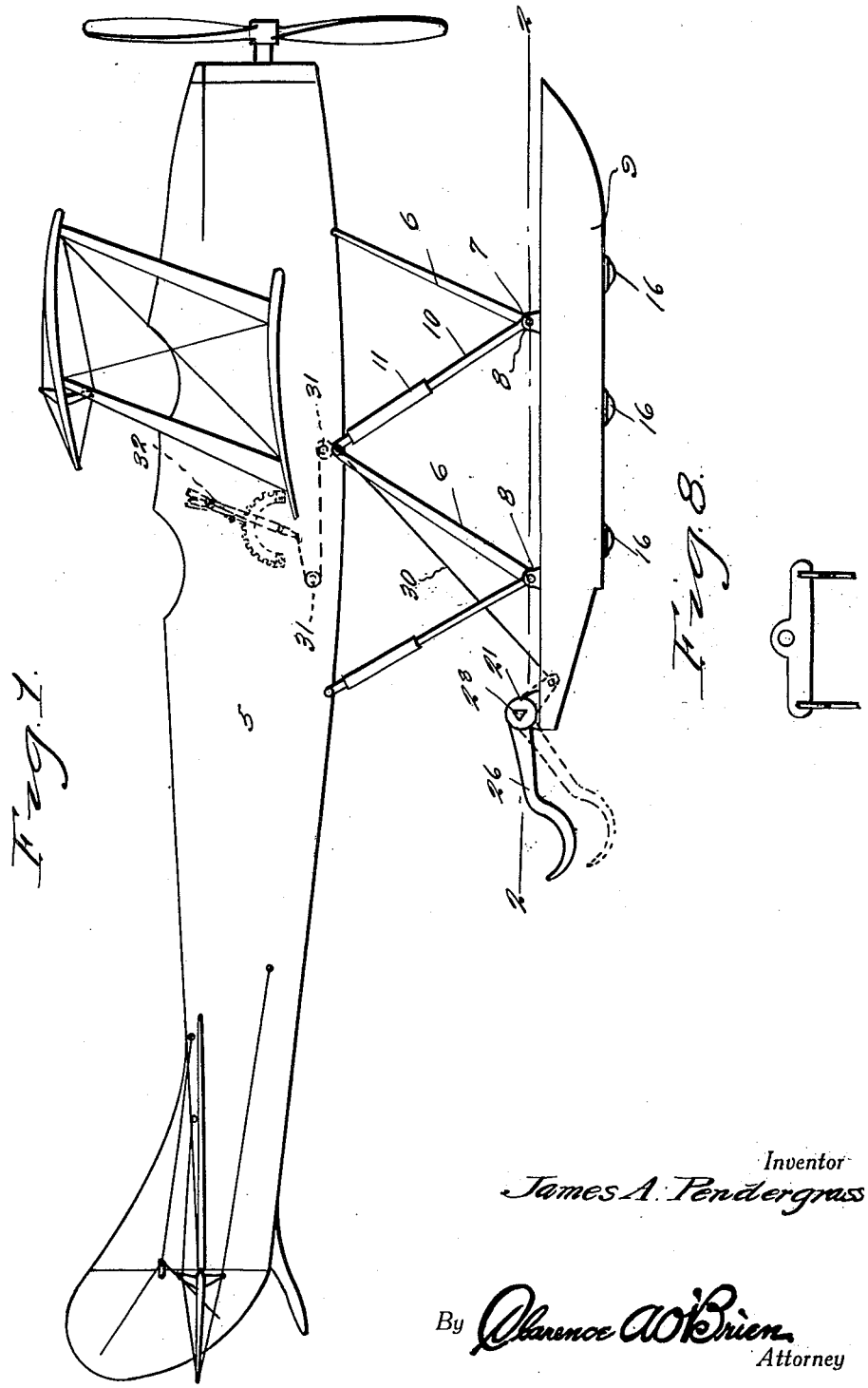
Inventor
James A. Pendergrass
By Clarence A. O'Brien
Attorney

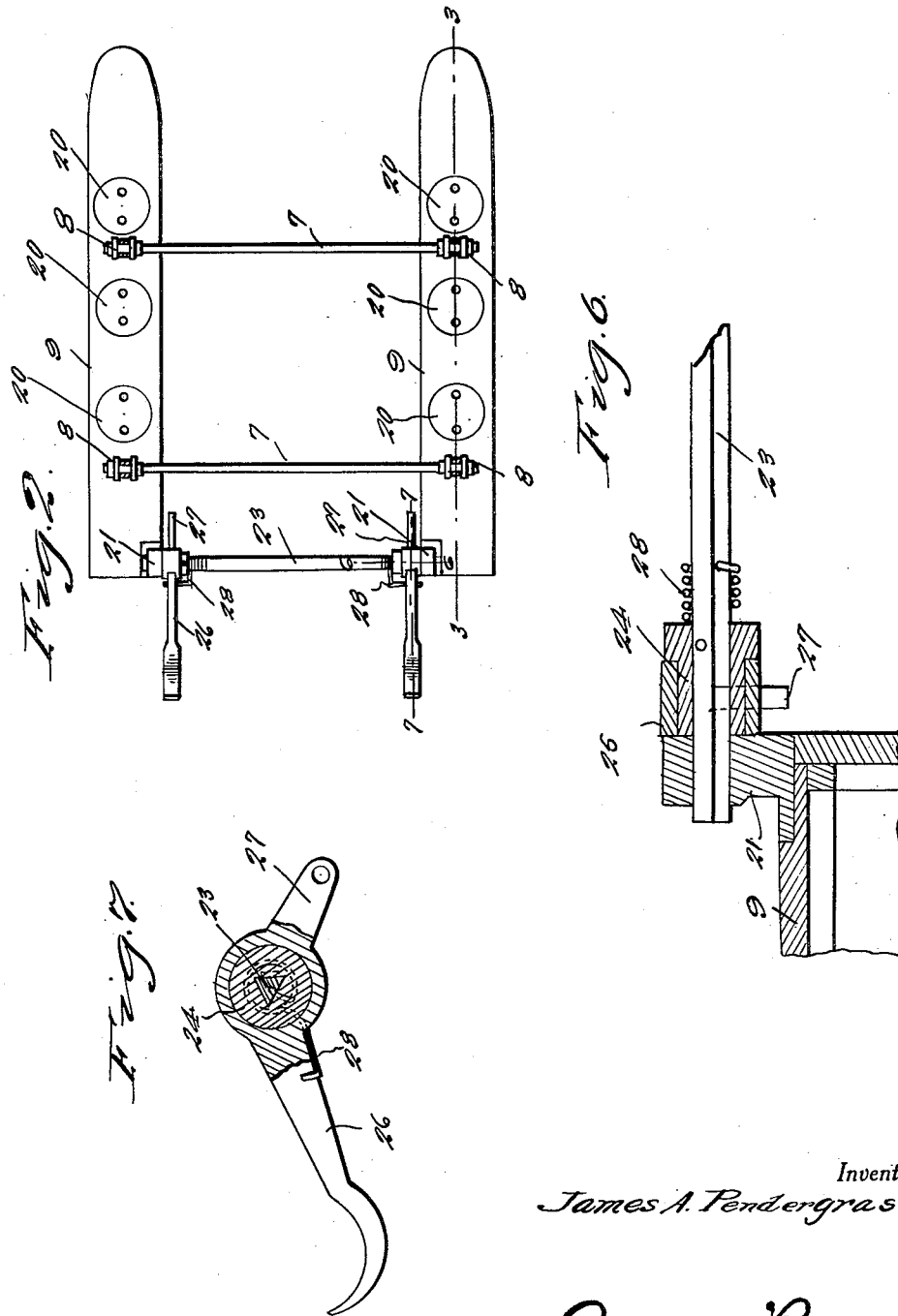

April 22, 1930.  J. A. PENDERGRASS  1,755,932
AIRCRAFT PONTOON
Filed June 5, 1929   3 Sheets-Sheet 3
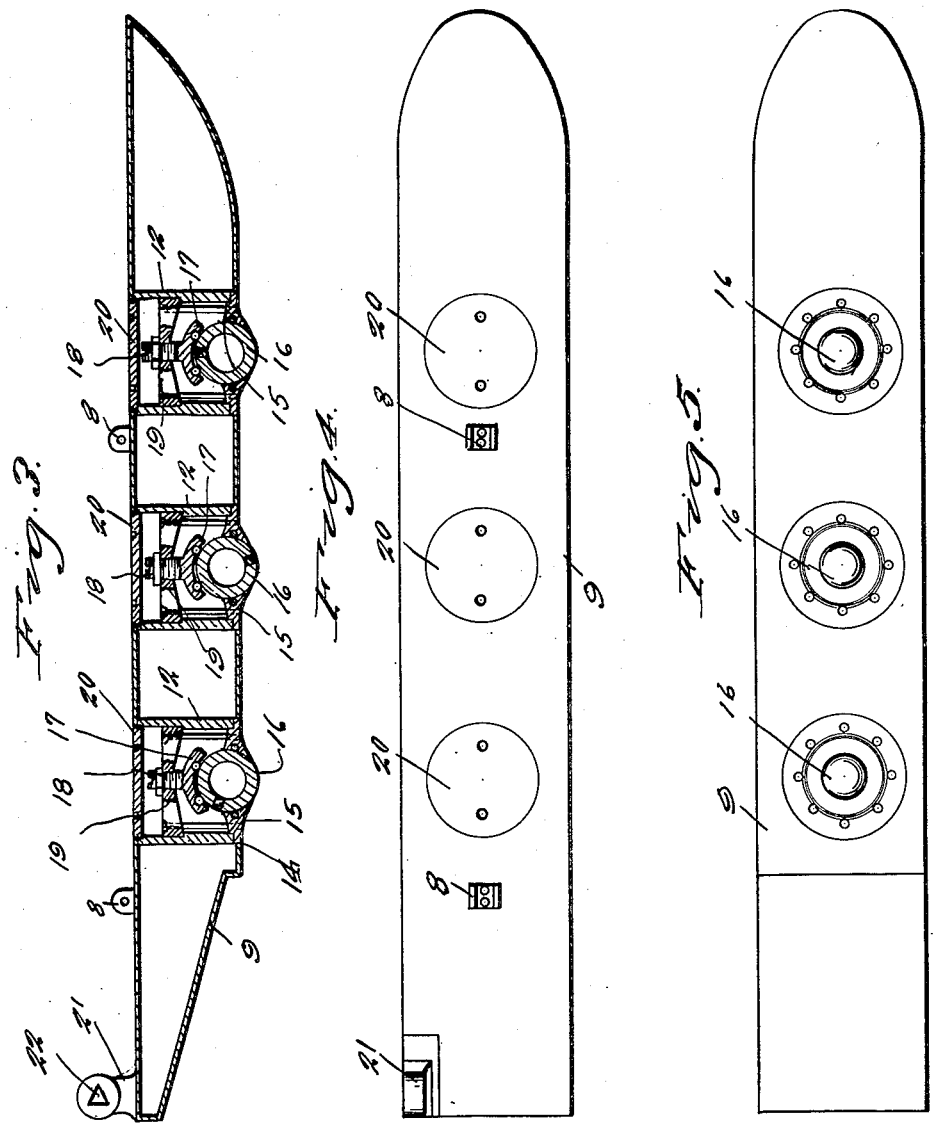
Inventor
James A. Pendergrass
By Clarence A. O'Brien
Attorney Patented Apr. 22, 1930

1,755,932

UNITED STATES PATENT OFFICE

JAMES A. PENDERGRASS, OF FRANKLIN FURNACE, OHIO

AIRCRAFT PONTOON

Application filed June 5, 1929. Serial No. 368,470.

The present invention relates to pontoons for aircraft so that the same may land or take off from either the ground or water.

Another very important object of the invention resides in the provision of pontoons in combination with aircraft and means for absorbing the shock of landing.

Another very important object of the invention resides in the provision of drag brakes in association with the pontoon.

A still further very important object of the invention resides in the provision of an improved structure of this nature which is simple, strong and durable, thoroughly efficient and reliable in use and operation, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of an aeroplane showing my improved pontoon structure mounted thereon, Figure 2 is a horizontal sectional view taken substantially on the line 2—2 of Figure 1, Figure 3 is a longitudinal section taken substantially on the line 3—3 of Figure 2, Figure 4 is a top plan view of the pontoon, Figure 5 is a bottom plan view thereof, Figure 6 is an enlarged detail section taken substantially on the line 6—6 of Figure 2, Figure 7 is a sectional view taken substantially on the line 7—7 of Figure 6, and Figure 8 is a view of a modified form of lever for operating the skid shaft.

Referring to the drawing in detail it will be seen that the numeral 5 denotes the fuselage of an aeroplane. Legs 6 are pivoted to the fuselage and incline downwardly and rearwardly and connected to rods 7 mounted in brackets 8 on top of hollow pontoons 9. The rods 7 extend between the pontoons. Rods 10 are engaged with the rods 7 and incline upwardly and rearwardly and are connected to the fuselage by means of shock absorbers 11.

Each pontoon is hollow and has extending vertically therein a plurality of cylinders 12 registering with openings 14 in the bottom of the pontoon and in these bottom openings 14 are circular bearings 15 through which partially project hollow balls 16. Anti-friction thrust bearings 17 engage the tops of the balls and are mounted on threaded shanks 18 extending through spiders 19 mounted in the cylinders. By threading the thrust bearing vertically on the spiders 19, any wear which may occur in the balls 16, bearing plate 15 or the thrust bearing 17 may be compensated for, as will be obvious.

The tops of the cylinders are closed by caps 20 threaded therein. By means of these balls 16 it is possible for the pontoons to be moved along the ground which is particularly useful in case it should be necessary to land on the ground and even more useful in maneuvering the aeroplane on the ground to and from the water.

From the rear inner corners of the pontoon there are brackets 21 with triangular openings 22 to receive a bar 23 triangular in cross section. Collars 24 are fixed to the end portions of the bar 23 and have cylindrical peripheries over which are rockable hubs 25 of brake skids. Arms 27 project from the hubs.

Springs 28 are anchored at their inner ends to the bar 23, coiled thereabout and have their outer ends engaged with the brake skid 26 to normally hold the same in a raised position.

Wires 30 are engaged with the arms 27 and are trained over pulleys 31 in the fuselage and operated by a suitable lever 22 so that the skids may be forced down into engagement with the ground for braking the aeroplane when landing.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a pontoon of the class described, a cylinder extending vertically through the pontoon and open at both ends, a circular bearing plate in the bottom end of the cylinder, a rotatable ball on said bearing plate projecting partially therethrough below the pontoon, and a vertically adjustable thrust bearing engaging the top of the ball and supported in the cylinder.

2. In a pontoon of the class described, a cylinder extending vertically through the pontoon and open at both ends, a circular bearing plate in the bottom end of the cylinder, a rotatable ball on said bearing plate projecting partially therethrough below the pontoon, and a vertically adjustable thrust bearing engaging the top of the ball, a spider in the cylinder, said thrust bearing having a shank threaded through said spider.

3. In a pontoon of the class described, a cylinder extending vertically through the pontoon and open at both ends, a circular bearing plate in the bottom end of the cylinder, a ball on said bearing plate projecting partially therethrough below the pontoon, and a thrust bearing engaging the top of the ball, a spider in the cylinder, said vertically adjustable thrust bearing having a shank threaded through said spider and a closure cap threaded in the upper end of the pontoon.

In testimony whereof I affix my signature.

JAMES A. PENDERGRASS.